(12) United States Patent
Nozaki

(10) Patent No.: US 6,287,354 B1
(45) Date of Patent: Sep. 11, 2001

(54) VEHICULAR AIR CLEANER DEVICE

(75) Inventor: Naoki Nozaki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/458,958

(22) Filed: Dec. 10, 1999

(30) Foreign Application Priority Data

Dec. 18, 1998 (JP) .................................................. 10-360729

(51) Int. Cl.[7] .................................................. B62D 61/02
(52) U.S. Cl. ........................... 55/385.3; 180/219; 180/225
(58) Field of Search .......................... 55/385.3, 385.1, 55/DIG. 28; 180/219, 225; 123/198 E; 280/280.1

(56) References Cited

U.S. PATENT DOCUMENTS

| | | | | |
|---|---|---|---|---|
| Re. 31,994 | * | 10/1985 | Tominaga et al. | 55/385.3 |
| 4,280,582 | * | 7/1981 | Kouyama et al. | 55/385.3 |
| 4,321,978 | * | 3/1982 | Tominaga et al. | 55/385.3 |
| 4,364,390 | * | 12/1982 | Kimura | 55/385.3 |
| 4,425,977 | * | 1/1984 | Michiuchi | 55/385.3 |
| 4,484,651 | * | 11/1984 | Hattori et al. | 55/385.3 |
| 4,509,613 | * | 4/1985 | Yamaguchi | 55/385.3 |
| 4,637,486 | * | 1/1987 | Iwai | 55/385.3 |
| 4,648,474 | * | 3/1987 | Shinozaki et al. | 55/385.3 |
| 4,796,719 | * | 1/1989 | Shiratsuchi | 55/385.3 |

FOREIGN PATENT DOCUMENTS

| | | | | |
|---|---|---|---|---|
| 0156245 | * | 12/1980 | (JP) | 55/385.3 |
| 132098 | * | 5/1987 | (JP) | 55/385.3 |
| 404354513 | * | 12/1992 | (JP) | 55/385.3 |
| 5105157 | | 4/1993 | (JP) . | |

* cited by examiner

Primary Examiner—David A. Simmons
Assistant Examiner—Minh-Chau T. Pham
(74) Attorney, Agent, or Firm—Birch, Stewart, Kolasch & Birch, LLP

(57) ABSTRACT

A vehicular air cleaner having an air inlet and an air outlet formed in one side of an air cleaner case. An air intake duct is connected to the air inlet through a duct seal, and a connecting tube connected to a carburetor is connected directly to the air outlet. The air cleaner device is provided with a combined seal-tube having an integral duct seal and connecting tube.

20 Claims, 7 Drawing Sheets

VEHICULAR AIR CLEANER DEVICE

BACKGROUND OF THE INVENTION

1. Field of the Invention

The present invention relates to an air cleaner device suitable for use in a vehicle, such as a two-, three-, or four-wheeled motor vehicle.

2. Background Art

Conventional air cleaners for two and three-wheeled vehicles are known having a box-shaped air cleaner case supported by a vehicle body frame. The vehicle engine is mounted on the frame, and an air inlet and an air outlet are formed in one side of the air cleaner case. An air intake duct is connected to the air inlet through a duct seal, and a connecting tube connected to the carburetor is directly connected to the air outlet. Such a conventional air cleaner is shown in Japanese Patent Laid-open No. 5-105157.

In the above conventional structure, a dedicated duct seal is required for connecting the air intake duct to the air inlet of the air cleaner case in an airtight manner. The duct seal is fitted to a downstream end of the duct in the air inlet. Because the duct seal is an independent component separate from the connecting tube, the number of components and cost increases.

Also, the separate duct seal and the connecting tube are disposed side by side at a predetermined spacing on the same mounting surface (a relatively narrow front surface) of the air cleaner case. If at least one of the air intake duct or the connecting tube (and hence the air inlet or the air outlet) is enlarged to increase performance, a special increase in size of the air cleaner case is required. In the vehicle mentioned above, because various vehicular components such as the engine, seat, fuel tank and a rear fork are disposed in the space around the air cleaner case, an attempt to increase the size of the air cleaner case results in a decrease of freedom in designing the vehicle.

An air cleaner device which allows for increased engine performance without a large increase in size of the air cleaner case is therefore desirable.

SUMMARY OF THE INVENTION

For achieving the above-mentioned object and other advantages, a vehicular air cleaner device having an air cleaner case is supported by a body frame with an engine mounted thereon. An air inlet and an air outlet are formed in one side of the air cleaner case, and an air intake duct is connected to the air inlet through a duct seal. A connecting tube connected to a carburetor is connected directly to the air outlet.

A combined seal-tube unit is formed by combining the duct seal and the connecting tube integrally with each other using an elastic material. The duct seal for connection of the air intake duct and the connecting tube connected to the carburetor are integral, forming a combined seal-tube unit. The number of components used is therefore reduced in comparison with conventional air cleaners.

Also, integration of the duct seal and the connecting tube permits their connected air inlet and air outputs to be positioned in close proximity to each other, so that at least one of the air inlet and the air outlet (and hence the connecting tube and the air intake duct) can be made larger in diameter easily without the need of specially increasing the size of the air cleaner itself. Consequently, such an increase in diameter permits improvement of the engine output performance while avoiding a decrease in the degree of layout freedom for the air cleaner case.

The air inlet and the air outlet are disposed in proximity to and in direct communication with each other through a communicating portion, the communicating portion being closed with the combined seal-tube unit. The air inlet and the air outlet are therefore rendered sufficiently close to each other without being partitioned from each other by a boundary wall. The communicating portion which results from this arrangement is closed easily with the combined seal-tube unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
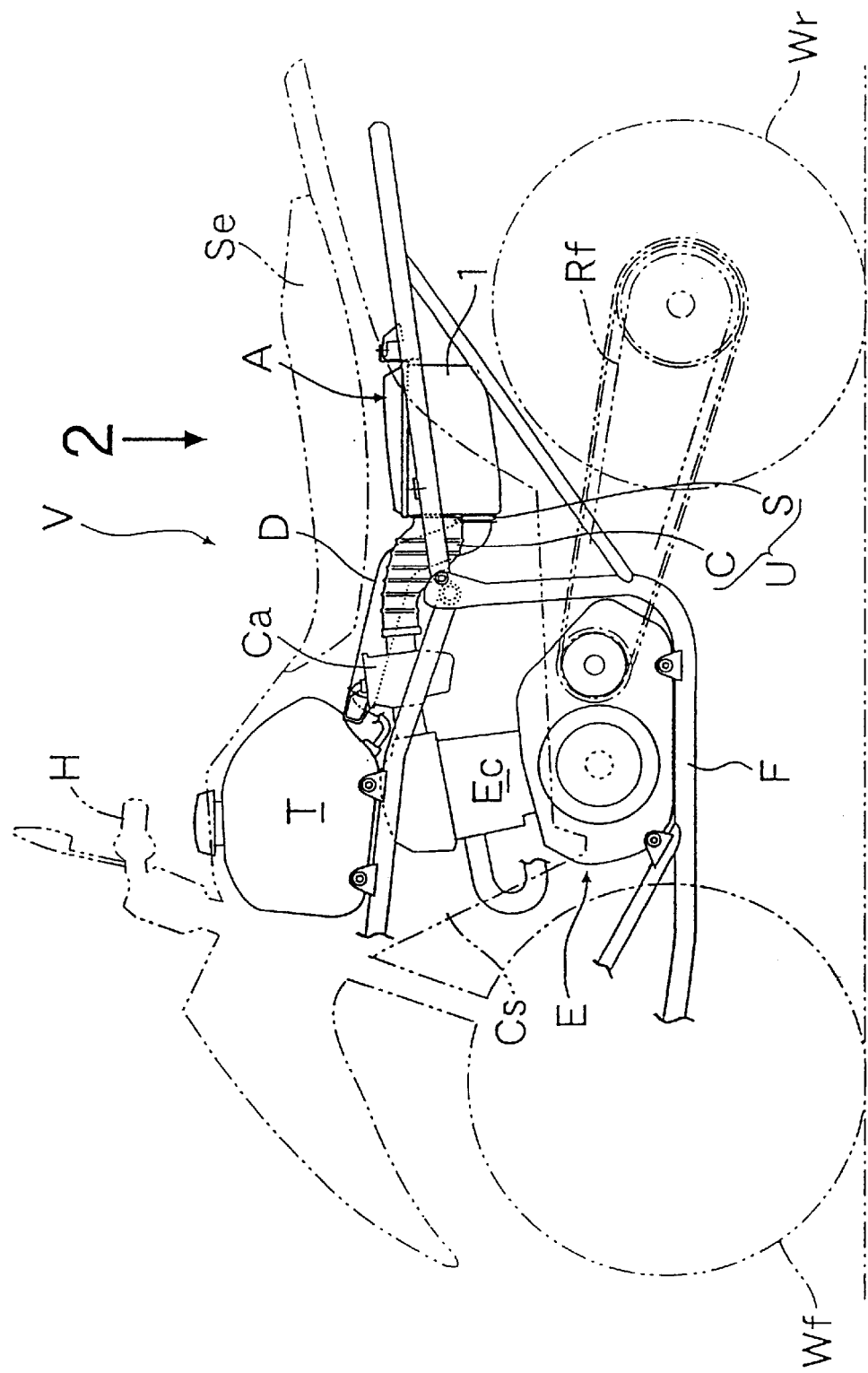
FIG. 1 is a schematic side view of a vehicle employing an air cleaner device according to an embodiment of the present invention.

In FIG. 1, a body frame F of a four-wheeled buggy V includes a plurality of frame pipes. A front wheel Wf is attached to a front portion of the body frame F so that it can be turned by a steering handle bar H, while a rear wheel Wr is attached to a rear portion of the body frame F so that it can swing vertically through a rear fork Rf. Both right and left sides of the body frame F are covered with side covers Cs.

Inside the side covers Cs an engine E with transmission for driving the rear wheel is supported at a nearly central portion of the body frame F. An air cleaner device A is connected through a carburetor Ca to an intake port which opens in a rear side of a cylinder portion Ec, formed on top of the engine E. Above the air cleaner device A and the carburetor Ca is disposed a seat Se, and a fuel tank T is disposed in front of the seat Se. The air cleaner device A, carburetor Ca, and fuel tank T are all covered with the side covers Cs, and an upper opening defined by the side covers Cs is closed with the seat Se.

Figure 2:
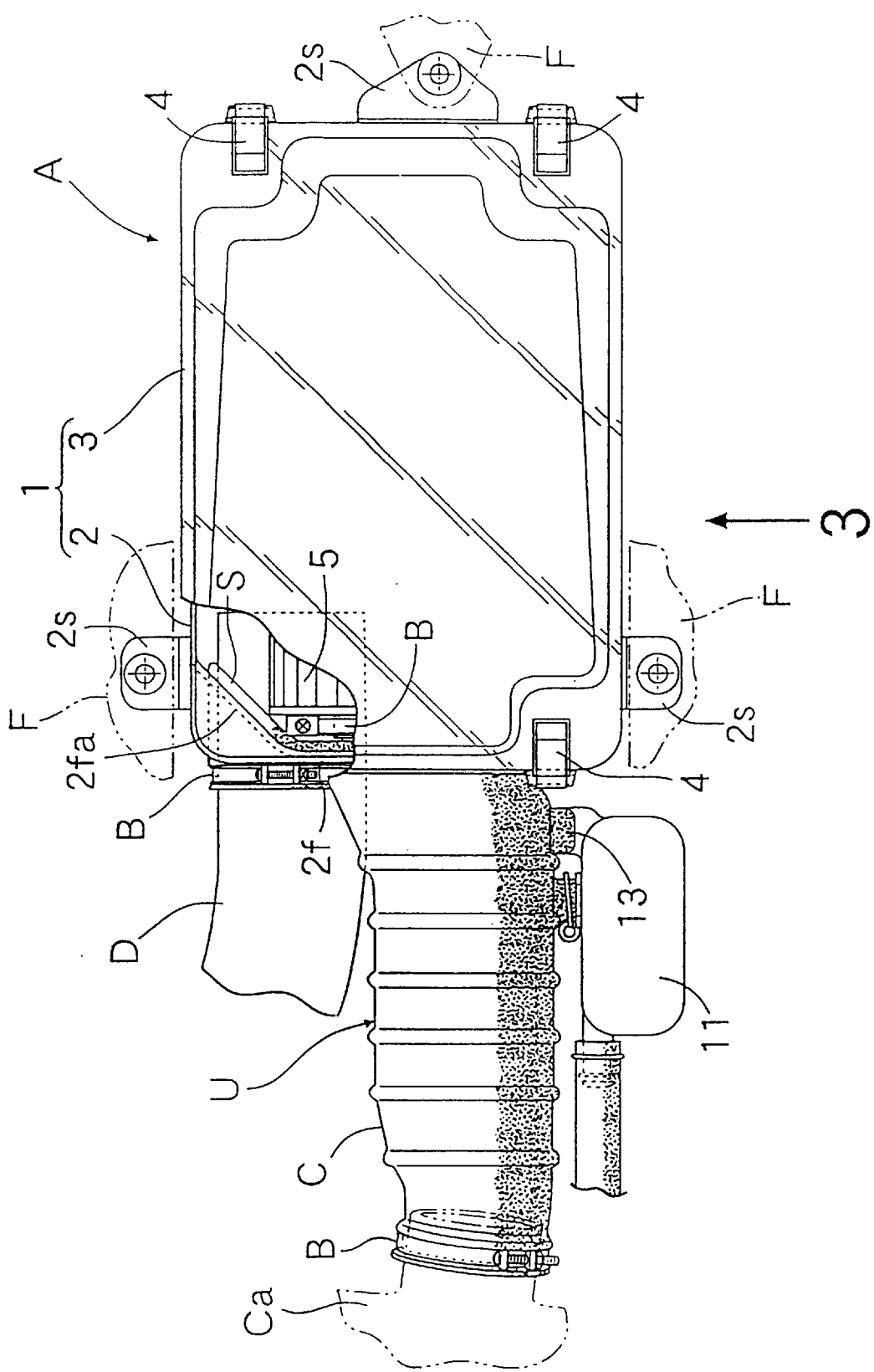
FIG. 2 is a partially cut-away plan view (an enlarged view as seen in the direction of arrow 2 in FIG. 1) of the air cleaner device.

With reference to FIG. 2, an air cleaner case 1 of the air cleaner device A is generally in the shape of a rectangular parallelepiped. The case 1 includes a box-shaped case body 2 and an opening/closing lid 3 which is fitted over the upper opening of the case body 2 along an upper edge of the case body. The opening/closing lid 3 is fixed to the upper edge of the case body 2 by a suitable holding means, such as a plurality of elastic retaining pawls 4 journaled to the case body 2. The retaining pawls are capable of being elastically engaged with and disengaged from an outer surface of the lid 3.

A plurality of stays 2s are projected at intervals on the outer side faces of the case body 2. Through these stays 2s the case body 2 is removably fixed to the body frame F with bolts or the like. In a front wall 2f of the case body 2 are formed an air inlet 2i and an air outlet 2o which is adjacent to the air inlet 2i obliquely downward. Half of the outer side of the air inlet 2i is formed in an inclined wall portion 2fa which is formed at a lower portion of either the right or the left side of the case body front wall 2f and is inclined rearward and to the side of the case body 2. The inclined wall portion 2fa is formed at a truncated corner of the otherwise generally parallelepipedal case body 2.

An air intake duct D is fitted in the air inlet 2i through a duct seal S and is thereby connected thereto. A connecting tube C connected to the carburetor Ca is directly fitted in and connected to the air outlet 2o. The duct seal S and the connecting tube C are combined integrally into a single seal-tube unit U which will be described later.

The air intake duct D is formed in a snorkel shape and a front end portion (i.e., an upstream end portion) is opened to the side in the vehicle body space inside the side covers Cs, behind the fuel tank T and just under the seat Se. This location prevents the entry of rain water and muddy water scattered from the wheels into an end of the opening. A rear end portion (i.e., a downstream end portion) of the duct D is fitted in the air inlet 2i in an airtight manner through the duct seal S and is in direct communication with the interior of the air cleaner case 1.

Figure 3:
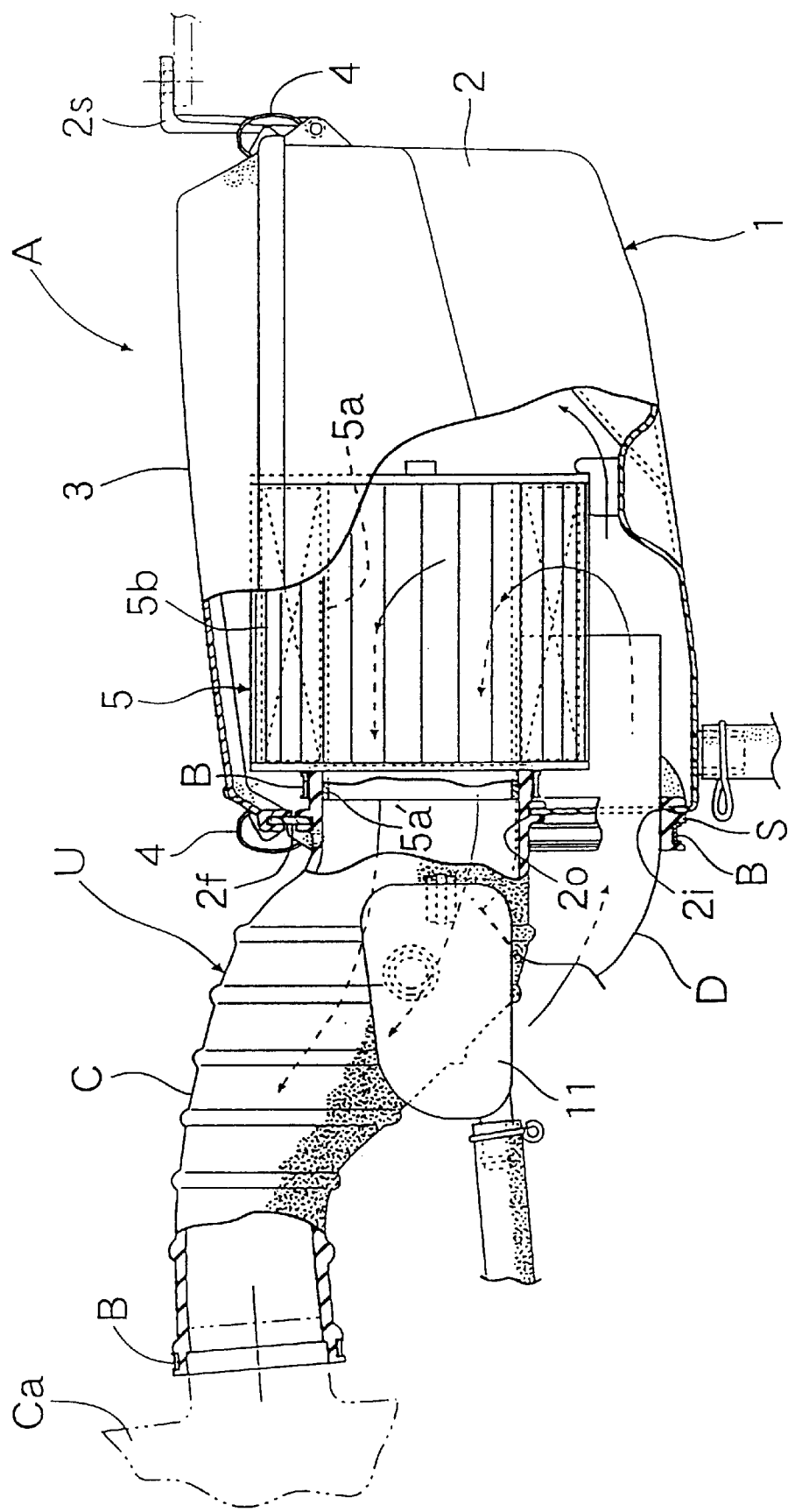
FIG. 3 is a partially cut-away side view (a view as seen in the direction of arrow 3 in FIG. 2) of the air cleaner device.

As shown in FIG. 3, an air filter 5 is fixed in the interior of the case body 2 of the air cleaner case 1. The air filter 5 is provided with a cylindrical filter element 5b and an inner tube 5a having a large number of vent holes (not shown). The inner tube 5a is fixed to an inner periphery of the filter element 5b. The inner tube 5a extends from a front wall of the filter 5 to form an extending tubular portion 5a' and a rear end of the connecting tube C is fitted on an outer periphery of the extending tubular portion 5a' and is fixed by a hose band B. The interior of the connecting tube C is thereby brought into direct communication with the interior of the filter 5 (i.e., the interior space of the inner tube 5a).

By this arrangement, air which has been sucked into the air intake duct D passes through the interior space of the duct D and further through the duct seal S (air inlet 2i), and is introduced into the air cleaner case 1. Then, the air flows through the air filter 5 toward the central side of the filter while it is filtered. Clean air after the filtration is fed through the air outlet 2o into the connecting tube C and is conducted to the carburetor Ca.

A combined seal-tube unit U is obtained by combining the duct seal S and the connecting tube C integrally with each other by molding with an elastic material. One such elastic material could be rubber, for example. The elastic material should have a high resistance to gasoline. The combined seal-tube unit U may be formed by first forming the duct seal S and the connecting tube C separately by molding, and thereafter bonding the two integrally with each other using a bonding means such as adhesion. The seal-tube unit U may also be molded as a unitary piece.

Figure 4:
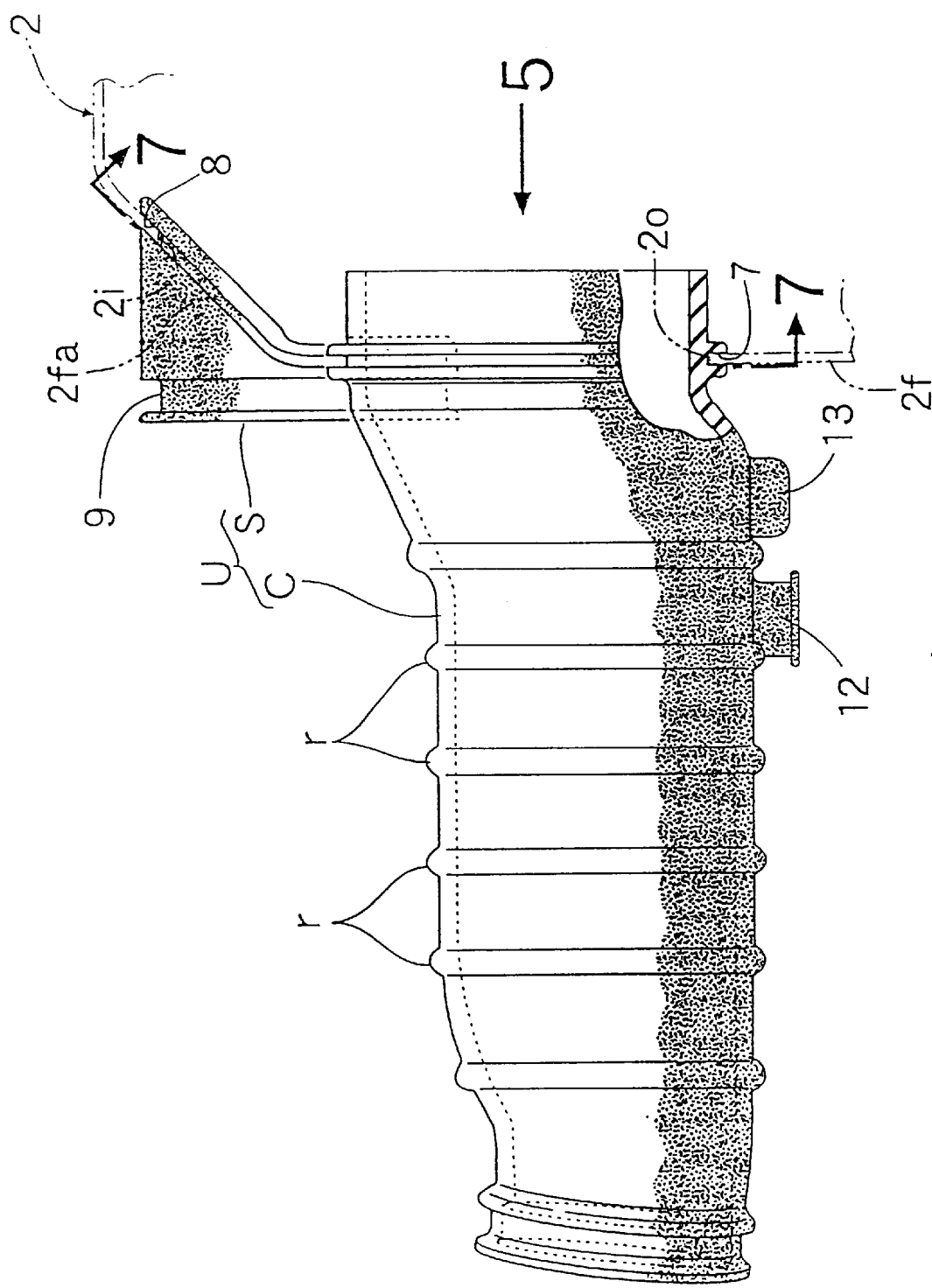
FIG. 4 is a plan view of a combined seal-tube unit used in the air cleaner device.
Figure 5:
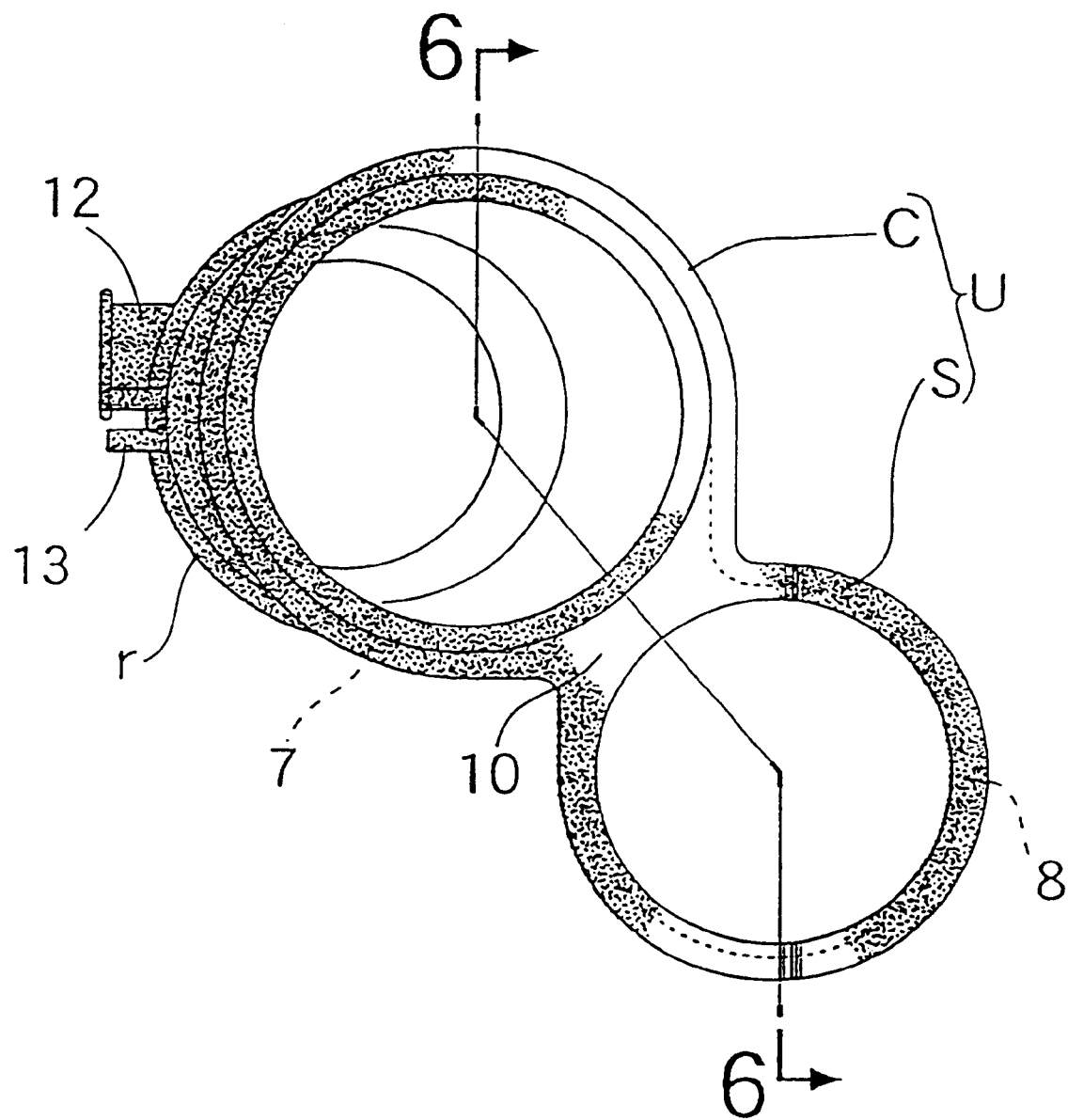
FIG. 5 is a view of the air cleaner device as seen in the direction of arrow 5 in FIG. 4.

Referring to FIGS. 3–5, the connecting tube C has a plurality of annular ribs r on its outer peripheral surface and is formed in a snorkel shape. A front end of the connecting tube C is removably connected to an upstream end of an intake passage of the carburetor Ca by a hose band B. An annular mounting groove 7 is formed in the outer periphery of the rear end portion of the connecting tube C. An opening edge portion of the air outlet 2o formed in the case body front wall 2f is fitted in the groove 7, with a sealing adhesive being applied to the fitted portion. On the outer periphery of an intermediate portion of the connecting tube C is integrally formed a connecting cylinder 12. A breather tank 11 for recycling blow-by gas from the engine E to the intake system is connected to the connecting cylinder 12. A plurality of retaining projections 13 are also integrally formed on the connecting tube, and are adapted to engage and support the breather tank 11.

An outer half of a rear end portion of the duct seal S extends rearward to match the inclined wall portion 2fa of the case body front wall 2f. An annular mounting groove 8 is formed in an outer periphery of the extending rear end portion. An opening edge portion of the air inlet 2i formed in the case body front wall 2f is fitted in the mounting groove 8 and a sealing adhesive is applied to the fitted portion. Annular retaining groove 9 is formed in an outer periphery of a front end portion of the duct seal S. A hose band B is engaged in the retaining groove 9 for fixing the rear end portion of the air intake duct D to the seal S.

Figure 6:
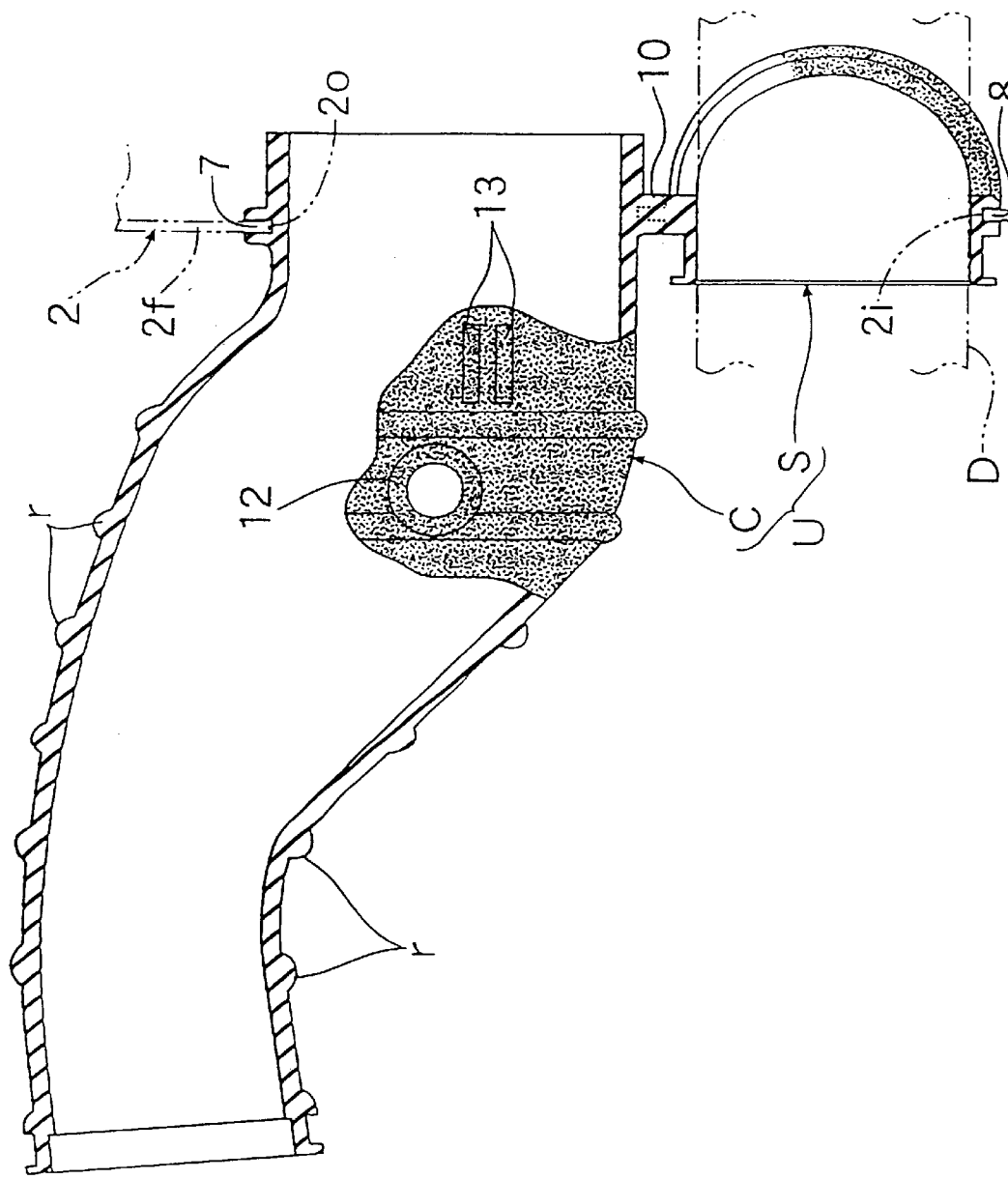
FIG. 6 is a sectional view taken on line 6—6 in FIG. 5.
Figure 7:
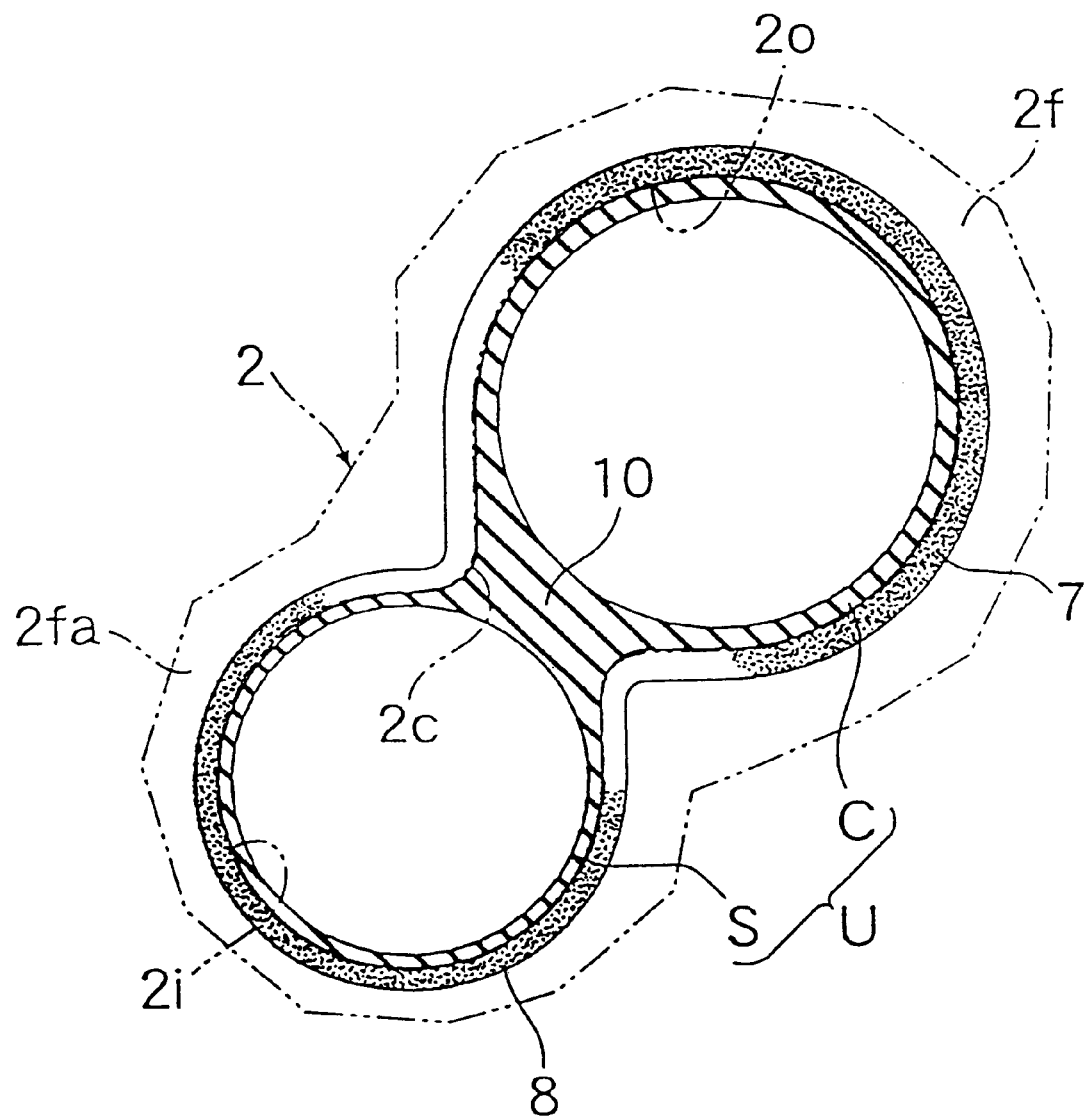
FIG. 7 is a sectional view taken on line 7—7 in FIG. 4.

Referring to FIGS. 6 and 7, the air inlet 2i and the air outlet 2o are formed in the case body front wall 2f in proximity to and in direct communication with each other (together forming a cocoon shape). A constricted communicating portion 2c between the air inlet 2i and the air outlet 2o is closed in an airtight manner by means of a boundary wall portion 10, between the duct seal S and the connecting tube C, which together form the combined seal-tube unit U.

Thus, because the air inlet 2i and the air outlet 2o are in direct communication with each other and are formed in a cocoon shape as a whole, the mounting grooves 8 and 7, which are formed respectively in the outer peripheries of the seal duct S and the connecting tube C in a corresponding relation to the air inlet 2i and the air outlet 2o, are also connected directly with each other, forming a cocoon-shaped endless annular groove.

The duct seal S for connecting the air intake duct D to the air cleaner case 1 is integral with the connecting tube C for connecting the carburetor Ca to the air cleaner case 1, to form a single combined seal-tube unit U. The number of components used is thus reduced in comparison with conventional air cleaners in which the connecting tube and case are separate components, which reduces cost.

Moreover, the integral combination of the duct seal S and the connecting tube C permits the connected air inlet 2i and air output 2o to come into close proximity to each other. Therefore, at least one of the air inlet 2i and the air outlet 2o (and hence the connecting tube C and the air intake duct D) can be enlarged in diameter without specially enlarging the size of the air cleaner case 1 (case body 2). Accordingly, although various vehicular components, including engine E, seat Se, fuel tank T and rear fork Rf, are arranged in the vehicle body space around the air cleaner case 1, and the space is limited, it is possible to improve the output performance of the engine without increasing the size of the air cleaner case 1.

Further, if the air inlet 2i and the air outlet 2o communicate directly with each other as in the illustrated embodiment, both can be brought into close proximity to each other without partitioning the two from each other using a boundary wall. Additionally, the communicating portion 2c created by such a proximate arrangement can be closed easily by the combined seal-tube unit U (especially the boundary wall portion 10 between the duct seal S and the connecting tube C).

Although an embodiment of the present invention has been described above, the invention is not limited thereto, but various modifications may be made within the scope of the invention. For example, although in the above embodiment the air inlet 2i and the air outlet 2o both formed in one side of the air cleaner case 1 communicate directly with each other, the air inlet 2i and the air outlet 2o may be formed separately (that is, a boundary wall may be present between the two).

The invention may be applied to any two-, three-, or four-wheeled vehicle for traveling on rough or improved roads.

Because the duct seal for air intake duct connection is combined integrally with the connecting tube which is connected to the carburetor, to afford a single seal-tube unit, it is possible to reduce the number of components used and hence reduce the cost. Also, an integral combination of the duct seal and the connecting tube permits the connected air inlet and air outlet to be brought into close proximity to each other, so that even without specially enlarging the air cleaner case it is possible to increase the diameter of at least one of the air inlet or the air outlet (and hence the connecting tube or the air intake duct). Consequently, it is possible to improve the output performance of the engine without decreasing the degree of freedom in the layout of the air cleaner case.

The air inlet and the air outlet can be brought into close proximity to each other without partitioning the two from each other using a boundary wall, and a communicating portion between the two created by such a proximate arrangement can be closed easily by the combined seal-tube unit.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicular air cleaner comprising:
   an air cleaner case, the air cleaner case including:
      a case body;
      an air inlet in the case body; and
      an air outlet in the case body;
      an air filter disposed within the air cleaner case; and
      a seal-tube unit engaged with the case body and in communication with the air inlet and the air outlet, the seal-tube unit including a single, one-piece duct seal and connecting tube.

2. The vehicular air cleaner of claim 1, wherein the duct seal is engaged with the air inlet in the case body, and the connecting tube is engaged with the air outlet in the case body.

3. The vehicular air cleaner of claim 2, wherein the duct seal includes a mounting groove, and the connecting tube includes a mounting groove, the two mounting grooves forming a continuous groove around a periphery of the seal-tube unit.

4. The vehicular air cleaner of claim 3, wherein:
   the mounting groove of the connecting tube engages the air outlet, an edge of the air outlet being disposed within the connecting tube mounting groove; and
   the mounting groove of the duct seal engages the air inlet, an edge of the air inlet being disposed within the duct seal mounting groove.

5. The vehicular air cleaner of claim 2, wherein the case body is substantially parallelepipedal, a portion of the air inlet being located at least partially on a truncated corner of the substantially parallelepipedal case body, at an inclined wall portion.

6. The vehicular air cleaner of claim 5, wherein the connecting tube has an opening which defines a first plane, and the duct seal has an opening which defines a second plane, the first plane being disposed at an angle to the second plane.

7. The vehicular air cleaner of claim 1, wherein the duct seal and the connecting tube are made integral by bonding with an adhesive.

8. The vehicular air cleaner of claim 1, wherein the air cleaner case further includes a lid secured to the case body by retaining pawls.

9. The vehicular air cleaner of claim 1, wherein the duct seal and the connecting tube are made from an elastic material.

10. The vehicular air cleaner of claim 2, wherein:
    the duct seal includes an opening which communicates with the air inlet;
    the connecting tube includes an opening which communicates with the air outlet; and
    the two openings are separated by and adjacent to a boundary wall portion of the seal-tube unit.

11. The vehicular air cleaner of claim 1, wherein the air inlet and the air outlet form a continuous opening in the case body.

12. The vehicular air cleaner of claim 1, wherein the air inlet and the air outlet are in direct communication with each other through a communicating portion in the air cleaner case body, the communicating portion being interrupted by the seal-tube unit when the seal-tube unit is engaged with the case body.

13. The vehicular air cleaner of claim 1, wherein the air filter is secured to an end of the connecting tube.

14. The vehicular air cleaner of claim 1, wherein the duct seal includes an annular retaining groove, the annular retaining groove securing a duct to the duct seal.

15. A vehicular air cleaner comprising:
    a case body;
    an air filter disposed within the case body; and
    a seal-tube unit including a single, one-piece duct seal and connecting tube.

16. The vehicular air cleaner of claim 15, wherein the duct seal opens into an air inlet of the case body, and the connecting tube opens into an air outlet of the case body.

17. The vehicular air cleaner of claim 16, wherein the connecting tube is bonded to the duct seal by an adhesive.

18. A vehicular air cleaner comprising:
    a case body having an air inlet and an air outlet, the air inlet and air outlet forming a continuous opening in the case body;
    an air filter disposed within the case body; and a seal-tube unit engaged with the case body, the seal-tube unit including a single, one-piece duct seal and connecting tube.

19. The vehicular air cleaner of claim 18, wherein the seal-tube unit includes a duct seal and a connecting tube, which are separated by a boundary wall portion.

20. The vehicular air cleaner of claim 19, wherein the duct seal and the connecting tube have a common outer periphery, the common outer periphery being engaged with the continuous opening in the case body.

* * * * *